Oct. 13, 1970     S. A. WINGATE     3,533,703

LINEAR MOTION ENCODER

Filed June 23, 1966     3 Sheets-Sheet 1

INVENTOR.
SIDNEY A. WINGATE

BY Morse, Altman & Oates

ATTORNEYS

INVENTOR.
SIDNEY A. WINGATE

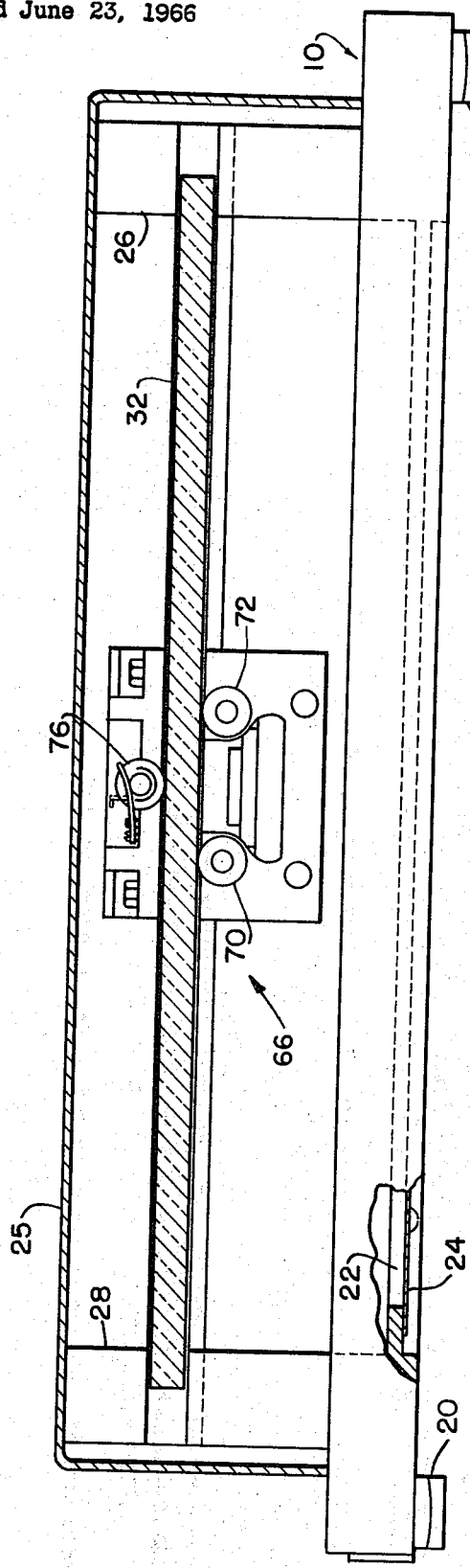
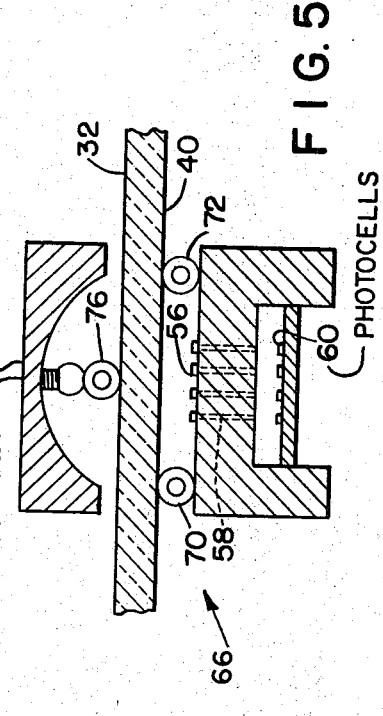

United States Patent Office 3,533,703
Patented Oct. 13, 1970

3,533,703
LINEAR MOTION ENCODER
Sidney A. Wingate, Concord, Mass., assignor, by mesne assignments, to Itek Corporation, Lexington, Mass., a corporation of Delaware
Filed June 23, 1966, Ser. No. 559,980
Int. Cl. G01b *11/04;* G01d *5/34*
U.S. Cl. 356—170              7 Claims

ABSTRACT OF THE DISCLOSURE

A linear encoder for yielding a digital output signal representative of movement along one axis. A stationary plate having evenly spaced light transmitting and light blocking portions is placed with its longitudinal axis closely parallel to the input movement being measured. A carriage is mounted for movement on the plate and consists of a light source on one side of the plate and photocells on the other side of the plate, such that movement of the carriage relative to the plate causes the photocells to render a pulsed output. The carriage is mounted on the plate by having two fixed rollers on one side of the plate and a spring loaded adjustable roller on the opposite side of the plate. The spring loaded roller functions to movably clamp the carriage to the plate. The input movement to be measured is coupled to the carriage by a mechanical coupling which compensates for misalignment between the longitudinal axis of the encoder and the movement being measured.

---

This invention relates generally to encoding devices and more particularly is directed towards an apparatus for encoding a linear motion input into electrical output signals.

There are many situations which require the precise measurement of a linear motion and/or the conversion of that motion into a useful signal representative of that motion. For example, in monitoring the linear movement of precision equipment or in measuring the linear distance between two points in a plane, it is often desirable to have the measurement appear as an output in digital form.

While there are instruments available for encoding linear motion, these devices are not altogether satisfactory from the standpoint of accuracy, ease of installation, size, stability and accommodation to misalignment between the input motion and the measuring instrument.

Accordingly, it is an object of the present invention to provide improvements in linear motion encoders.

Another object of this invention is to provide a linear motion encoder of high accuracy, compactness and stability and one which will not be adversely affected by small misalignment between the instrument and the input motion.

A further object of this invention is to provide a linear motion encoder which may be quickly and easily installed.

More particularly, this invention features a linear motion encoder, comprising an electro-optical transducer mounted adjacent the path of the input motion. The transducer includes a fixed precision linear scale to which is mounted a carriage assembly which rides along the scale parallel to the input motion and is connected to the input by means of a flexible coupling which is compliant in the two directions normal to the input motion thereby allowing for finite misalignment between the input motion direction and the encoder. The coupling is stiff in the direction of the input motion compared with the forces required to remove the encoder sliding element.

This invention also features a novel arrangement for mounting the transducer carriage along the scale in order to maintain a precise gap between the cooperating components.

Figure 1:
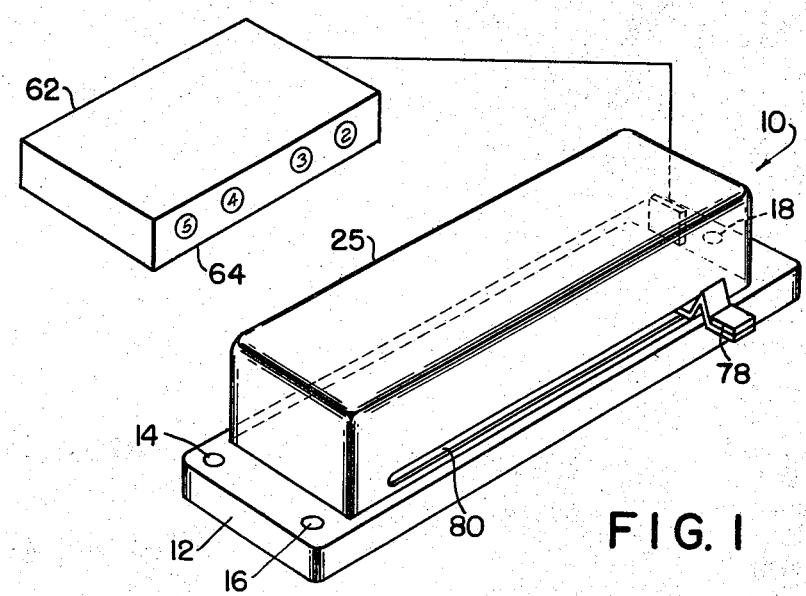
Figure 3:
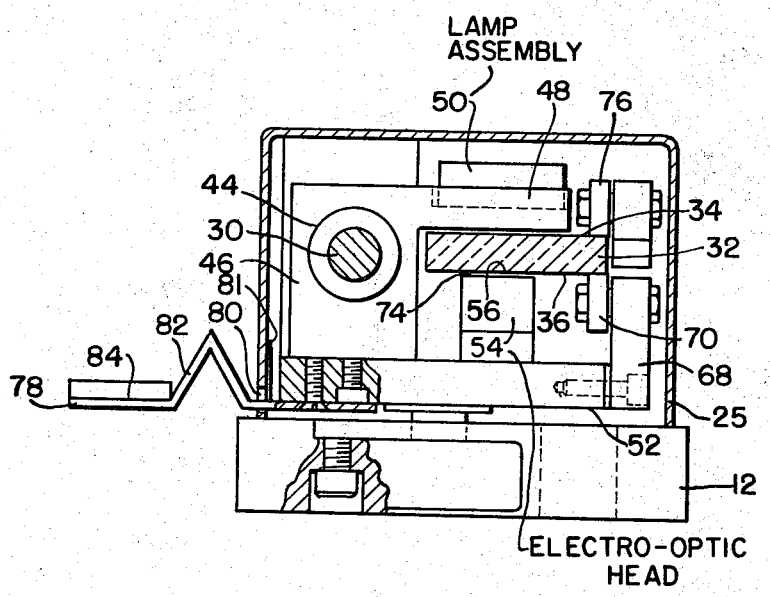
Figure 2:
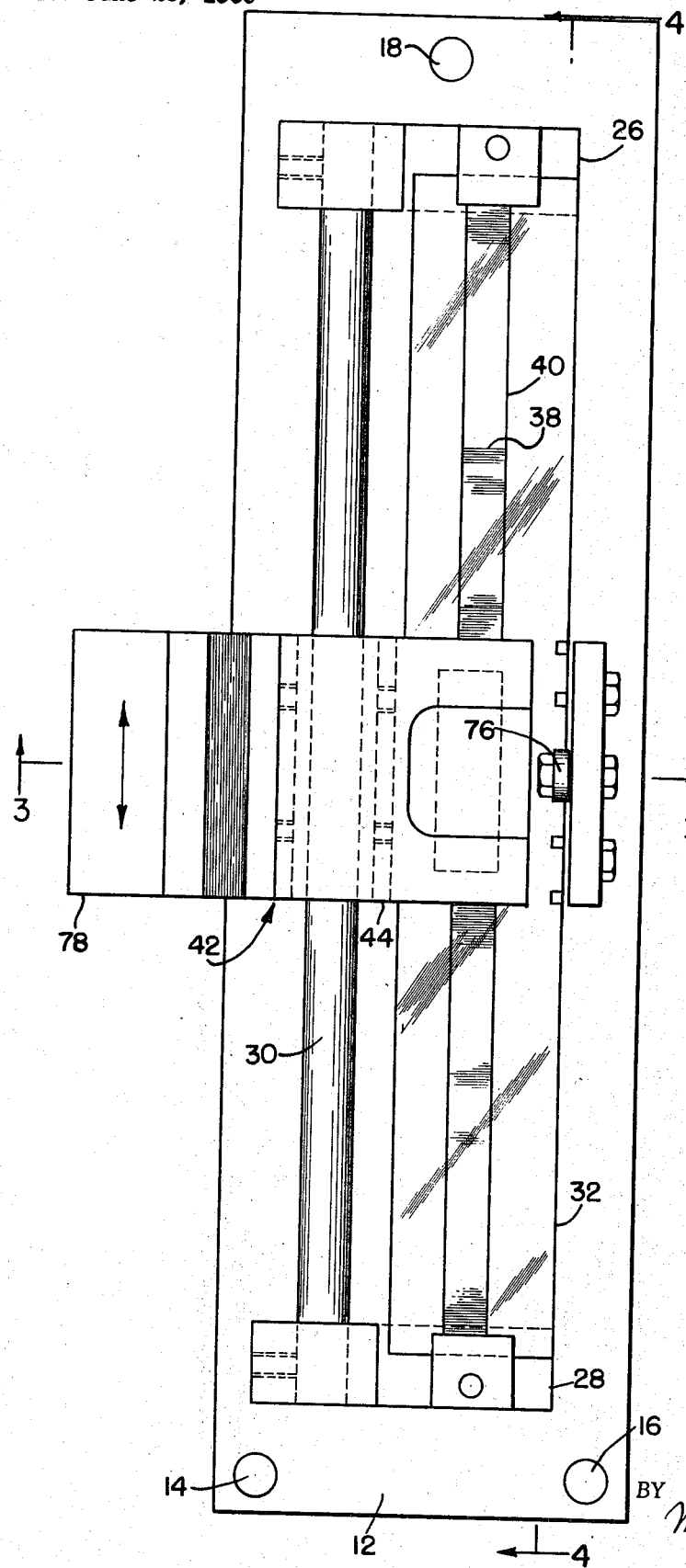

However, these and other features of the invention, along with further objects and advantages thereof, will become more fully apparent from the following detailed description of a preferred embodiment of the invention, with reference being made to the accompanying drawings, in which:

FIG. 1 is a view in perspective, somewhat schematic, of a linear motion encoder made according to the invention, FIG. 2 is a top plan view thereof but with the housing removed, FIG. 3 is a cross-sectional view taken along the line 3—3 of FIG. 2 but showing the housing in place, FIG. 4 is a cross sectional view taken along the line 4—4 of FIG. 2 and and also showing the housing in place, and, FIG. 5 is a detailed front view of the optical transducer assembly.

Referring now to the drawings, the reference character 10 generally indicates a linear motion encoder, having a rigid rectangular flat base 12 with a three-point mounting arrangement comprising three counterbored holes 14, 16 and 18 two at one end of the base and one at the opposite end thereof. Spherical washers 20 are used between the bottom of the base at each mounting point and the surface to which the encoder is attached. This provides an ideal three-point fastening which avoids any tendency to warp or bend the encoder as might occur with a four-point mounting arrangement.

The base 10 is formed with a longitudinal center opening 22 which is normally closed by means of a cover plate 24 detachably mounted thereto. It will be understood that the cover plate is provided to prevent the entry of dust and the opening 22 permits access to the interior of the mechanism for servicing and the like.

Mounted to the upper surface of the base 10 near either end thereof and within a rectangular boxed housing 25 are side plates 26 and 28 which support the ends of a hardened metal straight cylindrical rod 30 extending lengthwise of the base. The end plates 26 and 28 also support a linear code plate or precision scale 32 in the form of an elongated flat, rectangular glass plate. This plate has a smooth, flat upper surface 34 and a lower surface 36 which is formed with a series of very fine parallel lines 38, the lines being arranged perpendicular to the length of the plate and extending in a band 40 running lengthwise along the center portion of the plate. These lines are on the order of .2 mil in width and spaced from one another by a distance also on the order of .2 mil. The band 40 extends substantially the entire length of the plate and serves as part of the electro-optical encoding transducer as will presently appear.

Mounted for movement along the rod 30 is a carriage assembly 42 engaging the rod by means of a ball bushing 44. The carriage assembly comprises a block 46 having a rearwardly extending upper portion 48 which carries a lamp assembly 50 focused downwardly onto the glass scale. Mounted to the base of the block 46 is a rearwardly extending plate 52 which carries an electro-optical head 54 comprising a plurality of optical slits 56 mounted on the top surface thereof in closely spaced relation to the band 40 formed on the underside of the glass scale 32 and adapted to register with lines 38 as the carriage assembly is moved along the scale. The head is also formed with a series of vertical openings 58 in register with an array of photocells 60 positioned near the base of the head. These photocells are suitably connected by leads (not shown) to an electronic unit such as indicated by reference character 62 of FIG. 1 adapted to amplify the signals generated by the photocells and convert them into a digital display as on Nixie tubes 64.

It will be understood that as the carriage assembly moves lengthwise of the fixed glass scale 32 the lamp assembly will illuminate the band 40 and will pass light in discrete amounts through the slits 56 and onto the photocells 60. The slits are arranged in a spaced phased relation such that for any given position light will pass only through certain ones of the slits and not through the others. Thus, one or a pair of photocells will be illuminated and another pair will not be for any particular position. This produces two modulated output signals which accumulate on the counter to represent precisely in digital form the position of the carriage assembly and the movement of the assembly along the scale.

In order to maintain a very precise gap between the slits 56 and the underside of the glass scale 32 on which is the band 40, a roller assembly 66 is provided. This roller assembly comprises an upright bracket 68 fixed to the carriage assembly plate 52 and extending upwardly alongside the rear edge of the plate. The bracket carries a pair of spaced rollers 70 and 72 rotatably mounted to fixed stub shafts and positioned to engage the marginal lower edge of the scale. The rollers are positioned to define a precise gap 74 between the lower face of scale and the electro-optical head 54. Mounted on the top portion of the bracket is a spring loaded roller 76 which is positioned to ride along the upper marginal edge of the glass scale and thereby clamp the glass scale to the carriage assembly to insure that the desired gap is maintained regardless of the longitudinal position of the carriage assembly along the scale.

It will thus be understood that as the carriage assembly is moved lengthwise along the glass scale the light from the lamp assembly 50 passing through the band 38 and the slits 56 will be modulated to produce modulated electrical output signals by means of the photocells. These signals will represent the linear input motion.

In order to insure a true linear movement of the carriage with respect to the monitored input movement, a novel coupling 78 is provided. This coupling is secured to the carriage plate 52 and extends horizontally outwards from the housing through an elongated slot 80 formed in the forward face of the housing. In practice, a felt seal 81 extends length along the slot and bears against the coupling to prevent the entry of dust, etc., into the housing.

The coupling itself is in the form of a rectangular plate formed with a central longitudinal corrugation 82 and with suitable openings 84 for connection with the monitored mechanism. The configuration of the coupling renders is compliant in the two directions normal to the input motion thereby allowing for a finite misalignment between the input motion direction and the rod 30 that supports the carriage assembly. The coupling is stiff in the direction of the input motion compared with the forces required to move the encoder sliding elements. Typically, a maximum static friction of four ounces is required to move the carriage assembly. The corrugation 82 serves to take up any runout between the input motion and the assembly.

The output pulse generated by movement of the carriage assembly may be accumulated in the counter 62 in order to provide a digital indication of the input motion. The encoder may be made direction sensitive in that a reversible counter will indicate a total motion regardless of time history from any arbitrary starting point. The counter may be originally reset in any desired position of the input variable. Typical range of input motion is on the order of 6" and the device is capable of resolution on the order from 1.0 to 2.5 microns per quantum displacement.

The electronic unit 62 amplifies the photoelectric signals generated by movement of the carriage and processes them in order to generate direction sensed pulse output along either of two lines. When the input motion is in one direction, a pulse will be generated for each quantum of displacement along one line and no pulses will appear in the second line. For the opposite direction motion the pulses will appear on the second output line only. These outputs may be connected to a conventional reversible counter in order to indicate total input displacement.

The instrument may be quickly and easily installed. The three mounting points permit the base to be readily mounted in a manner that avoids any tendency to bend the encoder. Alignment is carried out making use of three reference surfaces provided on the mounting base, not shown in the drawings. The purpose of the alignment is to orient and fasten the unit so that the input motion to be digitized is parallel to the encoder motion to within a total indicated runout of 0.006 inch over the full input range of 6". With such an alignment, in one plane, the distance the encoder sliding element moves is equal to the square root of the sum of the squares of the input motion displacement and the runout displacement. The resulting error is only a few microinches.

The encoder measures straight line motion regardless of any irregularities in the movement of the input. The measurement is made of the actual straight line portion of a motion even if the motion itself is not precisely linear. The coupling permits a certain degree of runout between the input device and the encoder. Insofar as the encoder is a fully assembled functional unit, it may be quickly and easily installed and will provide extremely accurate readings immediately after it is installed. Insofar as the carriage assembly is moved lengthwise of the fixed scale, an extremely compact and precision instrument is provided.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. A linear encoder for measuring an input movement along a first axis comprising:
   (a) a plate having a longitudinal axis, said plate having an information code placed along its longitudinal axis;
   (b) means for positioning said plate with its longitudinal axis substantially parallel to the first axis along which the input movement is to be measured;
   (c) reading means coacting with said plate for reading said information code to produce an output signal indicative of the input movement;
   (d) means for transmitting the input movement to the linear encoder and for producing relative movement along said longitudinal axis between said plate and said reading means;
   (e) said transmitting means including coupling means which is flexible in a direction perpendicular to the longitudinal axis of said plate and rigid in a direction parallel thereto; and wherein
   (f) said reading means is coupled to said plate by roller means which engages opposite surfaces of said plate.

2. Apparatus as set forth in claim 1 wherein said transmitting means comprises a rectangular member which extends from the encoder in a direction perpendicular to the longitudinal axis, said rectangular member having a corrugation formed therein.

3. Apparatus as set forth in claim 2 wherein said roller means includes at least a first fixably mounted roller on one side of said plate, a second roller on the opposite side of said plate, and means for mechanically biasing said second roller against said plate.

4. Apparatus as set forth in claim 3 wherein there are two fixably mounted rollers spaced along said longitudinal axis on one side of said plate, and one resiliently mounted roller on the opposite side of said plate bearing against said plate and located between said two fixably mounted rollers relative to said longitudinal axis.

5. Apparatus as set forth in claim 4 wherein said information code includes a series of spaced discrete light transmitting and light blocking portions and said reading means includes a light source positioned on one side of said plate and an electro-optical unit positioned on the other side of said plate.

6. A linear encoder for measuring an input movement along a first axis comprising:
 (a) a plate having a longitudinal axis, said plate having an information code placed along its longitudinal axis;
 (b) means for positioning said plate with the longitudinal axis substantially parallel to the first axis along which the input movement is to be measured;
 (c) reading means coacting with said plate for reading said information code to produce an output signal indicative of the input movement;
 (d) said reading means having roller means for engaging opposite surfaces o fsaid plate, including first and second fixably mounted rollers spaced along said longitudinal axis on one side of said plate, and a third roller on the opposite side of said plate bearing against said plate and located between said two fixably mounted rollers relative to said longitudinal axis, and means for mechanically biasing said third roller against said plate; and
 (e) means for transmitting the input movement to the linear encoder to produce relative movement along said longitudinal axis between said plate and said reading means.

7. Apparatus as set forth in claim 6 wherein said information code includes a series of spaced discrete light transmitting and light blocking portions and said reading means includes a light source positioned on one side of said plate and an electro-optical unit positioned on the other side of said plate.

References Cited

UNITED STATES PATENTS

| | | | |
|---|---|---|---|
| 3,309,525 | 3/1967 | Johnson | 250—231 |
| 3,410,956 | 11/1968 | Grossiman et al. | 250—237 |
| 3,415,433 | 12/1968 | Shaw. | |
| 2,694,804 | 11/1954 | Wagner | 356—169 X |
| 3,218,911 | 11/1965 | Bower et al. | 356—169 |
| 3,367,231 | 2/1968 | Meinecke et al. | 356—98 |

OTHER REFERENCES

Gaertner Advertisement: Applied Optics, vol. 1, No. 6, November 1962, p. A 18.

RONALD L. WIBERT, Primary Examiner

F. L. EVANS, Assistant Examiner

U.S. Cl. X.R.

250—234, 237